March 18, 1975 F. PECHSTEIN Re. 28,366

ATOMIZING PUMP

Original Filed Nov. 21, 1966 2 Sheets-Sheet 1

Inventor:
Fred Pechstein
By: Spencer & Kaye
Attorneys

Inventor:
Fred Pechstein
By: Spencer & Kaye
Attorneys

United States Patent

Re. 28,366

Reissued Mar. 18, 1975

28,366

ATOMIZING PUMP

Fred Pechstein, Berlin, Germany, assignor to Firma Rudolf Albert, Hemer, Germany Original No. 3,399,836, dated Sept. 3, 1968, Ser. No. 595,761, Nov. 21, 1966. Application for reissue July 30, 1973, Ser. No. 383,504

Int. Cl. B05b *1/00*

U.S. Cl. 239—333 13 Claims

Matter enclosed in heavy brackets [ ] appears in the original patent but forms no part of this reissue specification; matter printed in italics indicates the additions made by reissue.

The present invention relates to the field of atomizers, and particularly to atomizing pumps especially for atomizing perfume or similar cosmetic preparations.

Pumps of the type with which the present invention is concerned include a piston arranged to be driven into the pump housing against a spring pressure so as to deliver the liquid to a nozzle. It is known that, in order to obtain the highest possible degree of atomization, it is preferable to provide at the pump outlet a so-called turbulence nozzle.

However, it has been found that even the use of a nozzle of this type in prior art atomizing pumps does not completely preclude the occurrence of an insufficient atomization and the formation of droplets in the vicinity of the nozzle particularly when the pump piston is subjected to a relatively slow depression movement. Furthermore, the liquid remaining in the nozzle after the atomization operation tends to dry up and to obstruct the nozzle.

It is a primary object of the present invention to eliminate these drawbacks.

A more specific object of the present invention is to produce a complete atomization of the liquid delivered to the nozzle, regardless of the speed with which the piston is depressed.

Another object of the present invention is to prevent liquid from remaining in the region of the nozzle at the end of an atomization operation.

A still further object of the present invention is to simplify the construction of atomizing pumps.

These and other objects according to the present invention are achieved by the provision of a pump assembly for conveying liquids to be atomized, which assembly includes first means defining a first variable volume space and a fluid flow passage in communication with the first space, and second means defining a second variable volume space in communication with the first space. The pump according to the present invention further includes first valve means associated with the first means and disposed for isolating the flow passage from the first space, connecting means connecting the second means to the first valve means for controlling the opening and closing of the valve means and for permitting a limited degree of relative movement between the first valve means and the second means, and biasing means associated with the second means for urging it into a condition corresponding to the minimum volume of the second space.

According to preferred embodiments of the present invention the first means are constituted by a cylinder and a piston disposed for movement in a longitudinal direction in the cylinder for varying the volume of the first space, and the second means are also composed of a cylinder, which has a smaller cross-sectional area than the first cylinder, and a piston disposed for movement in the cylinder in the longitudinal direction for varying the volume of the second space. In these preferred embodiments, the liquid flow passage is formed, at least partially, in the piston of the first means, and the connecting means are connected between the valve means and the piston of the second means. Furthermore, the biasing means, which are preferably constituted by a helical compression spring, are connected to the piston of the second means.

Additional objects and advantages of the present invention will become apparent upon consideration of the following description when taken in conjunction with the accompanying drawings in which.

Figure 1:
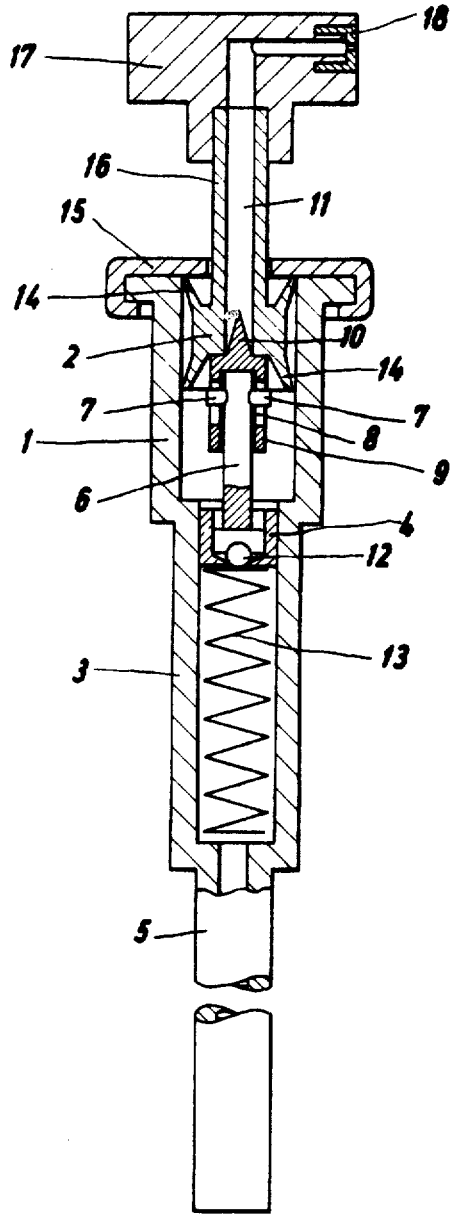
FIGURE 1 is a longitudinal, cross-sectional view of a first embodiment of the present invention.

The device of FIGURE 1 includes a main cylinder 1 housing a main piston 2, and a further cylinder 3 housing a further piston 4, the cylinder 3 having a smaller cross-sectional area than the main cylinder 1. The further cylinder 3 and its associated piston 4 are arranged upstream, with respect to the direction of liquid flow, of the main cylinder 1 and its associated piston 2. At the lower, or upstream, end of the cylinder 3 is connected a suction tube 5 preferably made of the same material as, and forming a unit with, cylinders 1 and 3. The suction tube 5 is arranged to extend substantially to the bottom of a container with which the pump is to be associated.

Piston 2 is formed with an axial passage 11 which passes through the piston and through a stem 16 integral with the piston and is associated with a valve 10 which tends to close passage 11 when the piston 2 is moved in the fluid conveying direction, i.e., downwardly. Piston 4 is provided with an axial passage whose lower end defines a seating for a ball valve 12 which tends to open the passage when piston 4 is driven in the fluid conveying direction, i.e., downwardly. *The ball valve 12 thus acts as a further valve means, serving the necessary function of preventing back flow of fluid from the first variable volume space within main cylinder 1 to the second variable volume space beneath the piston 4 within the cylinder 3.*

Piston 4 is also provided with an upwardly-extending axial stem 6 carrying diametrically extending fingers 7 which engage in longitudinally elongated slots 8 formed in a collar 9 connected to valve 10. The upper end of stem 6 bears against the underside of valve 10 in order to normally urge the valve into its closing position.

Stem 16 carries a plunger knob 17 formed with a radially extending passage in permanent communication with passage 11. The outer end of the radially extending passage in knob 17 is equipped with a nozzle 18, which is preferably in the form of a turbulence nozzle, whose opening is in permanent communication with passage 11.

The upper end of the space defined by cylinder 1 is closed by a cover 15 which restricts the upward movement of piston 2. Each end of piston 2 is provided with an annular scaling collar 14 which is preferably integral with the piston and which forms a seal with the wall of cylinder 1. The entire piston assembly is supported by a helical compression spring 13, which is preferably constituted by a propeller thrust spring, disposed within cylinder 3 and bearing against the lower surface of piston 4.

The outer surface of cylinder 1 is preferably threaded to be screwed into the mouth of the container with which it is to be associated.

In operation, the knob 17 is first depressed, moving the assembly of pistons 2 and 4 and valve 10 downwardly and compressing spring 13. The fluid trapped in cylinder 1 transmits a pressure which maintains ball valve 12 in a closed condition. Since the cylinder 3 has a smaller cross-sectional area than cylinder 1, the fluid passing from cylinder 1 into cylinder 3 causes the piston 4 to move at a higher velocity than piston 2. During this interval, the fluid pressure in cylinder 1 maintains valve 10 closed. Therefore, as the downward movement of both pistons continues, diametrically extending fingers 7 move downwardly with respect to slots 8 until they come to bear against the lower extremities of these slots. When this occurs, the continued downward movement of piston 4 at a higher velocity than that of piston 2 causes fingers 7 to draw valve 10 away from the inlet opening of passage 11, thus permitting this latter passage to communicate with the interior of cylinder 1.

With the passage thus open, the pressure imposed on the fluid in the cylinders, principally by the energy stored in compressed spring 13 and secondarily by the continued downward movement of piston 2, causes fluid to be driven through passage 11 and to be atomized by nozzle 18. The flow of fluid through passage 11 continues until piston 4 has been driven upwardly by spring [4] *13* to a sufficient height to cause the upper end of stem 6 to return valve 10 to its closing position.

Since the pressure necessary for delivering the fluid to nozzle 18 and for causing its atomization is supplied mainly by compressed spring 13, the atomization will always be complete and will occur at a constant rate, regardless of the speed at which knob 17, and hence piston 2, is being depressed.

According to one of the novel features of the present invention, it is only necessary to properly select the length of arcuate slots 8, and hence the degree of relative movement between stem 6 and valve 10, in order to cause the latter valve to be opened at a predetermined point in the downward travel path of [valve] *piston* 4 and thus to cause the atomization to be carried out at a predetermined pressure, which depends on the degree of compression of spring 13 at the start of the atomization operation.

According to another important advantage realized by the present invention, the liquid flow passage 11 is always automatically and tightly sealed when the apparatus is not in use.

As the piston 4 moves upwardly under the influence of spring 13 and drives fluid through passage 11 and nozzle 18, it also produces a pressure drop in the space occupied by spring 13 which causes liquid to be drawn through tube 5 and into this latter space. Then, after the subsequent closure of passage 11 by valve 10, both valves begin ascent at the same velocity since stem 6 is pressing upwardly on valve 10 and valve 10 is, in turn, pressing upwardly on piston 2. As a result, the volume of the space enclosed between pistons 2 and 4 progressively increases during this ascending movement. This causes the pressure in this space to drop so as to cause the liquid contained in cylinder 3 to be drawn upwardly past ball valve 12 and into cylinder 1. Thus, a new supply of liquid is introduced into the space enclosed by cylinder 1 at the end of each atomization cycle.

Figure 2:
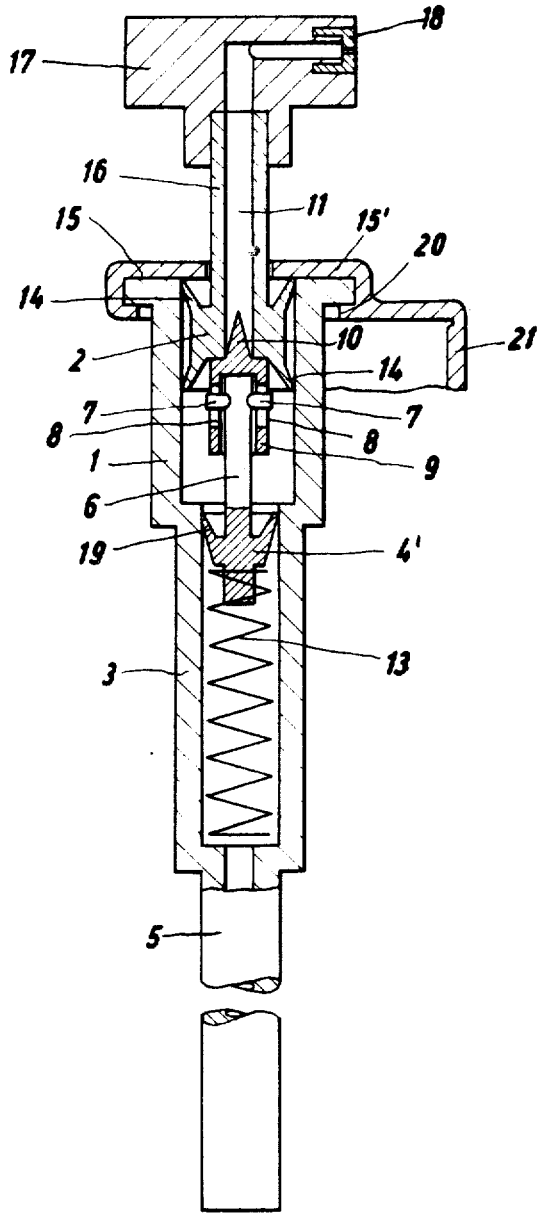
FIGURE 2 is a view similar to that of FIGURE 1 of another embodiment of the present invention.

FIGURE 2 shows a modified form of construction according to the present invention in which elements identical to those of the embodiment of FIGURE 1 are identified by the same reference numerals.

The embodiment of FIGURE 2 differs from that of FIGURE 1 primarily in the construction of the small piston 4'. In this embodiment, the ball valve is eliminated from this piston and its function is taken over by a resilient collar 19 which extends toward piston 2 and which bears resiliently against the inner wall of cylinder 3 to form a seal therewith. When a pressure drop is created in the space between pistons 2 and 4', in the manner described above, collar 19 is drawn away from the walls of cylinder 3 in order to permit fluid to flow upwardly into cylinder 1.

According to another modification of the present invention, the cover member 15 can be replaced by a cover member 15', which is shown at the right-hand side of FIGURE 2, having a fastening lip 20 which bears firmly against the flange at the upper end of cylinder 1 and a threaded cap 21, the cap 21, lip 20 and cover 15' being made of a single piece. In place of the single annular lip 20, the cover 15' can be provided with a plurality of individual, circumferentially spaced fastening tabs for attachment to the cylinder 1. The provision of a threaded cap 21 makes it relatively easy to mount the pump assembly on a separately provided container, such as a perfume flacon, for example.

Pump assemblies according to the present invention can also be constructed for atomizing water, cleansing agents, coloring agents, oils, etc.

According to a further novel feature of the present invention, construction of the pump assembly is simplified by making the piston 4' and the collar 19 of a single piece. Construction is further simplified by also making the piston 4' of FIGURE 2, or the piston 4 of FIGURE 1, integral with its associated stem 6. Construction is still further simplified by making the step 16 integral with the piston 2.

According to yet another advantageous feature of the present invention, the construction of embodiments of the present invention is even further simplified by making the cylinders 1 and 3 and the tube 5, or at least a socket for connection of the tube 5, from a single piece of material and by arranging the cylinders 1 and 3 coaxially in line with one another.

For the same purpose, the piston 2 and collars 14 are preferably made of a single piece.

Yet another feature of the present invention resides in the fact that the entire cross-sectional area of the smaller cylinder 3 preferably opens completely into the large cylinder 1.

It will be understood that the above description of the present invention is susceptible to various modifications, changes, and adaptations, and the same are intended to be comprehended within the meaning and range of equivalents of the appended claims.

What is claimed is:

1. A pump assembly for conveying liquids to be atomized and comprising, in combination:

(a) first means defining a first variable volume space and a fluid flow passage in communication with said first space;

(b) second means defining a second variable volume space in communication with said first space;

(c) first valve means associated with said first means and disposed for isolating said passage from said first space;

(d) connecting means connecting said second means to said first valve means for controlling the opening and closing of said valve means and for providing a limited degree of relative movement between said first valve means and said second means; [and]

(e) biasing means associated with said second means for urging it into a condition corresponding to the minimum volume of said second space[.] ;

(*f*) *and further valve means for preventing back flow of fluid from said first variable volume space to said second variable volume space.*

2. An arrangement as defined in claim 1 wherein: said first means are constituted by a first cylinder and a first piston, said first piston defining said liquid flow passage and being disposed for movement in a longitudinal direction in said first cylinder for varying the volume of said first space; said second means are constituted by a second cylinder having an internal cross-sectional area, in a plane perpendicular to the direction of movement of said first piston, which is smaller than that of said first cylinder, and a second piston disposed for movement in said second cylinder in said longitudinal direction for varying the volume of said second space; said first valve means are associated with said first piston for isolating said passage from said first space at least during a portion of the travel of the said first piston in a direction which decreases the volume of said first space; and said connecting means connect said first valve means to said second piston.

3. An arrangement as defined in claim 2 wherein said first and second pistons are disposed coaxially for movement in the same direction.

4. An arrangement as defined in claim 2 wherein said first and second cylinders are disposed in line with one another, with the entire internal cross-sectional area of said second cylinder being in communication with that of said first cylinder.

5. An arrangement as defined in claim 2 wherein said connecting means are constituted by a stem carrying a plurality of laterally extending fingers, and said first valve means are formed with a plurality of elongated, longitudinally extending slots each of which receives a respective one of said fingers, the length of said slots determining the degree of relative movement permitted between said first valve means and said second piston.

6. An arrangement as defined in claim 2 wherein said connecting means are integral with said second piston.

7. An arrangement as defined in claim 2 wherein said *further valve means* [second piston] includes an annular collar which *encircles said second piston and* extends toward said first piston and which bears elastically against the inner wall of said second cylinder to form a normally closed valve which is maintained in a closed condition by pressure in the space between said first and second piston.

8. An arrangement as defined in claim 7 wherein said collar is integral with said second piston.

9. An arrangement as defined in claim 2 further comprising a socket for attaching a suction tube, wherein said socket, said first cylinder and said second cylinder are constituted by a single body of material.

10. An arrangement as defined in claim 2 further comprising a suction tube connected to said second cylinder, said tube, said first cylinder and said second cylinder constituting a single body.

11. An arrangement as defined in claim 2 further comprising a supporting stem connected to said first piston and traversed by said passage, a plunger knob carried by said supporting stem, and a turbulence nozzle carried by said knob in permanent communication with said passage for receiving liquid conveyed by said pump assembly, said nozzle having an atomizing opening extending at right angles to said longitudinal direction in which said pistons move with respect to their associated cylinders.

12. An arrangement as defined in claim 2 further comprising two sealing collars, each disposed at a respective end of said first piston and forming a seal with the inner wall of said first cylinder, said collars being integral with said first piston.

13. An arrangement as defined in claim 12 wherein said biasing means are constituted by a helical compression spring which bears against said second piston.

References Cited

The following references, cited by the Examiner, are of record in the patented file of this patent or the original patent.

UNITED STATES PATENTS

| | | | |
|---|---|---|---|
| 3,185,354 | 5/1965 | Lipman | 222—321 |
| 3,211,346 | 10/1965 | Meshberg | 222—321 X |
| 3,223,292 | 12/1965 | Keeney et al. | 222—321 |
| 3,229,864 | 1/1966 | Roder | 222—321 |

M. HENSON WOOD, Jr., Primary Examiner

J. J. LOVE, Assistant Examiner

U.S. CL. X.R.

222—321